US007737946B2

(12) United States Patent
Yen

(10) Patent No.: US 7,737,946 B2
(45) Date of Patent: Jun. 15, 2010

(54) MOUSE WITH A TWO-WAY MOVABLE COVER MODULE

(75) Inventor: Kuei-Jen Yen, Tucheng (TW)

(73) Assignee: Forward Electronics Co., Ltd., Taipei (TW)

( * ) Notice: Subject to any disclaimer, the term of this patent is extended or adjusted under 35 U.S.C. 154(b) by 802 days.

(21) Appl. No.: 11/641,691

(22) Filed: Dec. 20, 2006

(65) Prior Publication Data
US 2008/0055251 A1 Mar. 6, 2008

(30) Foreign Application Priority Data
Sep. 1, 2006 (TW) .............................. 95132340 A

(51) Int. Cl.
*G09G 5/08* (2006.01)
(52) U.S. Cl. ........................ 345/163; 345/164; 345/165; 345/166; 345/159; 345/161; D14/402; D14/403
(58) Field of Classification Search ................ 345/8, 345/156–169, 173, 179, 180, 419, 619, 629, 345/638; 250/221; 359/630; 324/207.2
See application file for complete search history.

(56) References Cited
U.S. PATENT DOCUMENTS

| 6,411,281 | B1 * | 6/2002 | Sasselli et al. ............... 345/163 |
| 7,598,943 | B2 * | 10/2009 | Tsai et al. .................... 345/163 |
| 2002/0158837 | A1 * | 10/2002 | Hou ........................... 345/156 |
| 2007/0132733 | A1 * | 6/2007 | Ram ........................... 345/163 |

* cited by examiner

*Primary Examiner*—Richard Hjerpe
*Assistant Examiner*—Olga Merkoulova
(74) *Attorney, Agent, or Firm*—Bacon & Thomas, PLLC

(57) ABSTRACT

A mouse is disclosed to include a mouse body, which has a coupling structure on the top and two accommodation open chambers respectively at two sides of the coupling structure for storing different items, and a movable cover module, which has a top cover and a coupling structure fastened to the top cover and coupled to the coupling structure of the guide structure for allowing movement of the top cover relative to the mouse body selectively to a first open position to close the first accommodation open chamber and to open the second accommodation open chamber, a second open position to close the second accommodation open chamber and to open the first accommodation open chamber, or a closed position to close the first and second accommodation open chambers and to keep storage items in the accommodation open chambers from sight.

9 Claims, 5 Drawing Sheets

MOUSE WITH A TWO-WAY MOVABLE COVER MODULE

BACKGROUND OF THE INVENTION

1. Field of the Invention

The present invention relates to a computer mouse and more particularly, to such a mouse with a two-way movable cover module that is slidable in two reversed directions to selectively open different chambers for accommodating accessories.

2. Description of Related Art

Following fast development of wireless technology, various new technology products use the advantage of wireless technology to attract consumers to buy them. A mouse is commonly used as communication means between a computer and the user for the advantage of convenience in operation. At present, although mouse control technology has been well developed, it is still an important subject to improve the convenience in use when designing a mouse for computer.

Regular mobile computer mice include two types, namely, the wired mice and the wireless mice. A wired mobile computer mouse allows receiving of the cable to the outside or inside space of the mouse manually or automatically. Further, a wireless mobile computer mouse must carry a battery and a wireless receiver. If the user forgets to carry a battery and/or the wireless receiver when using a wireless mobile computer mouse, the wireless mobile computer mouse cannot be used so that causing great inconvenience to the user.

There are several wireless mobile computer mouse and wireless receiver combination products available on the market. These products allow the wireless receiver to be directly received in the bottom side of the wireless computer mouse, or directly inserted into a chamber in the wireless computer mouse. However, these designs do not provide the ways to keep the wireless receiver firmly in place when placed in the wireless computer mouse. Further, when the wireless receiver is placed in the wireless computer mouse, the sense of beauty of the outer appearance of the wireless computer mouse is not maintained intact.

Therefore, it is desirable to provide a computer mouse that eliminates the aforesaid drawbacks.

SUMMARY OF THE INVENTION

The present invention has been accomplished under the circumstances in view. According to the present invention, the mouse comprises a mouse body, and a movable cover module. The mouse body has a top side, a first accommodation chamber, a first opening formed on the top side in communication with the first accommodation chamber, a second accommodation chamber, a second opening formed on the top side in communication with the second accommodation chamber, and a coupling structure installed in the top side. The movable cover module comprises a top cover, and a coupling structure fastened to the top cover and coupled to the coupling structure of the guide structure for allowing movement of the top cover relative to the mouse selectively to a first open position, a second open position, and a closed position.

When the top cover is moved to the first open position, the top cover closes the first opening and the first accommodation chamber simultaneously, opens the second opening and the second accommodation chamber. When the top cover is moved to the second open position, the top cover closes the second opening and the second accommodation chamber, simultaneously, opens the first opening and the first accommodation chamber. When the top cover is moved to the closed position, the top cover closes the first opening, the first accommodation chamber, the second opening, and the second accommodation chamber.

The mouse body further has a mounting chamber, and a mounting opening defined on the top side in communication with the mounting opening for the mounting of the coupling structure of the mouse body.

The coupling structure of the mouse body comprises a base, at least one sliding rail fixedly arranged on the base for guiding movement of the movable cover module relative to the mouse body, a recessed mounting hole formed on the base, and a magnetic member bonded to the wall defining the recessed mounting hole for securing the movable cover module to one of the first open position, the second open position and the closed position.

Further, the top cover has two screw holes. The coupling structure of the movable cover module comprises a cross slide, which has two mounting through holes corresponding to the two screw holes of the top cover and a recessed mounting hole, at least one sliding groove formed on the cross slide and respectively coupled to the at least one sliding rail of the coupling structure of the mouse body to guide movement of the movable cover module relative to the mouse body, a magnetic member bonded to the wall defining the recessed mounting hole of the cross slide, and two screws respectively inserted through the mounting through holes of the cross slide and threaded into the two mounting screw holes of the top cover to affix the cross slide to the top cover.

Further, the top cover has two top portions respectively protruded from two ends thereof for stopping against the at least one sliding rail to limit moving distance of the top cover along the at least one sliding rail relative to the mouse body.

Further, the magnetic member of the coupling structure of the mouse body and the magnetic member of the coupling structure of the movable cover module can be NdFeB-2 permanent magnets, regular permanent magnets, or other equivalent magnets.

According to a second embodiment of the present invention, the mouse body has a locating hole and a recessed mounting hole on the top side; the top cover has three recessed mounting holes and a pivot hole on the bottom side; the coupling structure of the movable cover module comprises three magnetic members respectively bonded to the walls defining the three recessed mounting holes of the top cover; the coupling structure of the mouse body comprises a pivot axle, which has a first end fixedly received in the locating hole of the mouse body and a second end pivoted to the pivot hole of the top cover for allowing turning of the top cover about the pivot axle, and a magnetic member bonded to the wall defining the recessed mounting hole of the mouse body and adapted to attract one of the three magnetic members of the coupling structure of the movable cover module and to further hold the top cover in a respective one of the first open position, the second open position and the closed position.

According to the second embodiment of the present invention, the mouse body further comprises a stop block protruded from the top side; the top cover has a stop portion for stopping against the stop block of the mouse body to limit the turning angle of the top cover about the pivot axle to a predetermined range.

Further, the magnetic member of the coupling structure of the mouse body and the magnetic members of the coupling structure of the movable cover module according to the second embodiment of the present invention can be NdFeB-2 permanent magnets, regular permanent magnets, or other equivalent magnets.

DETAILED DESCRIPTION OF THE PREFERRED EMBODIMENT

Figure 1:
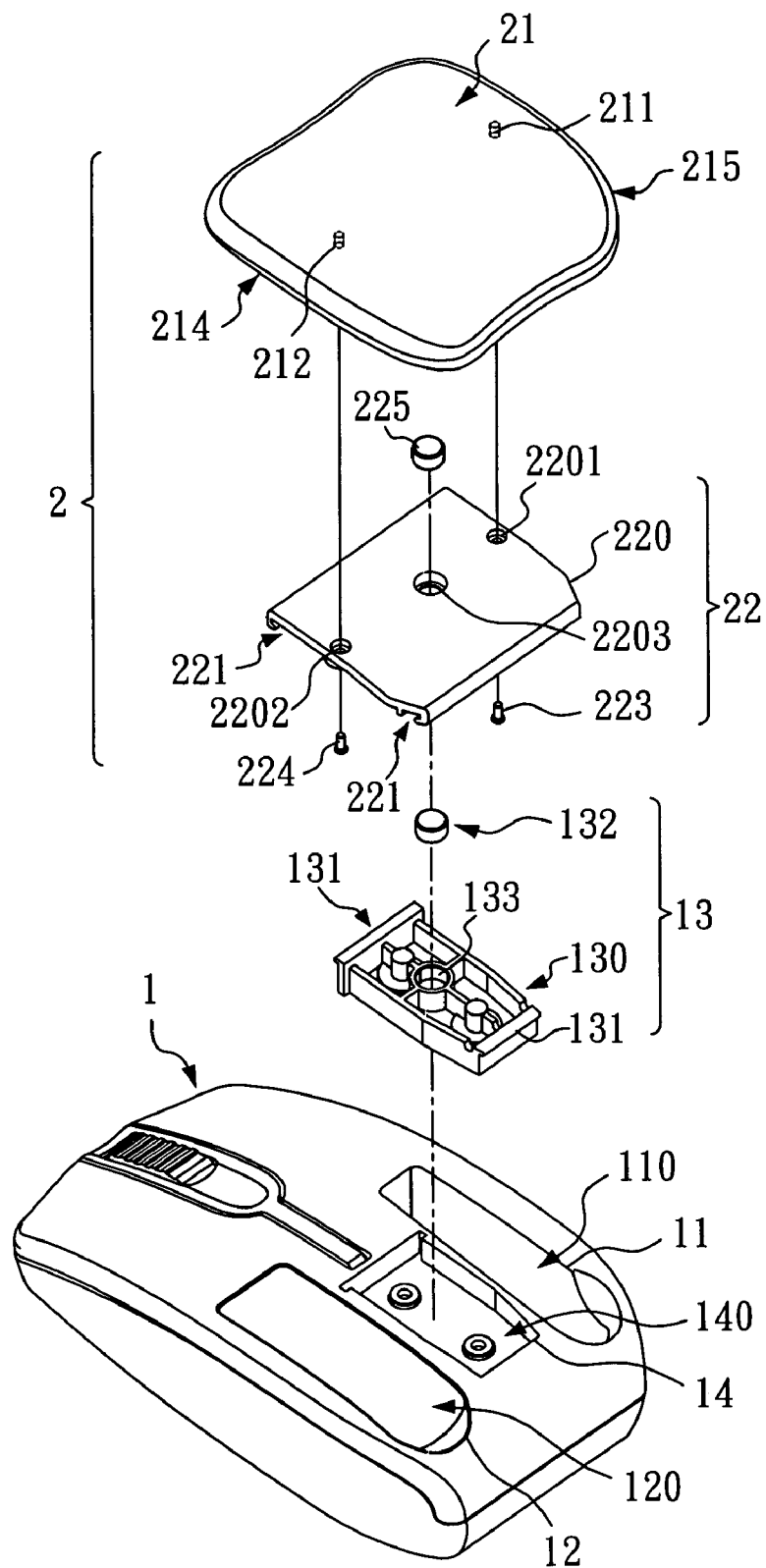
FIG. 1 is an exploded view of a mouse in accordance with a first embodiment of the present invention.

FIG. 1 is an exploded view of a mouse in accordance with a first embodiment of the present invention. As illustrated, the mouse comprises a mouse body 1, and a movable cover module 2.

The mouse body 1 has, on the top side thereof, a first opening 11, a second opening 12, a mounting opening 14, a first accommodation chamber 110 vertically downwardly extending from the first opening 11, a second accommodation chamber 120 vertically downwardly extending from the second opening 12, and a mounting chamber 140 vertically downwardly extending from the mounting opening 14. Further, a first coupling structure 13 is inserted through the mounting opening 14 and fixedly fastened to the mounting chamber 140 by, for example, screws.

The first coupling structure 13 comprises a base 130, two sliding rails 131, a magnetic member 132, and a recessed mounting hole 133. The two sliding rails 131 are fixedly provided at two distal ends of the base 130 in a parallel manner. The recessed mounting hole 133 is formed on the inside of the base 130. The magnetic member 132 is bonded to a wall defining the recessed mounting hole 133. According to this embodiment, the magnetic member 132 is an NdFeB-2 permanent magnet.

The movable cover module 2 comprises a top cover 21. Further, a second coupling structure 22 is fastened to the top cover 21.

The top cover 21 has two mounting screw holes 211 and 212 extending through the top and bottom sides, and two stop portions 214 and 215 respectively protruded from the two opposite lateral sides.

The second coupling structure 22 comprises a cross slide 220, two sliding grooves 221, two screws 223 and 224, and a magnetic member 225. According to this embodiment, the magnetic member 225 is an NdFeB-2 permanent magnet. The cross slide 220 has two mounting through holes 2201 and 2202, and a recessed mounting hole 2203. The magnetic member 225 is bonded to a wall defining the recessed mounting hole 2203 of the cross slide 220. The two screws 223 and 224 are respectively inserted through the mounting through holes 2201 and 2202 of the cross slide 220 and threaded into the two mounting screw holes 211 and 212 of the top cover 21 to affix the cross slide 220 to the top cover 21. The two sliding grooves 221 are formed on the bottom side of the cross slide 220 and respectively coupled to the sliding rails 131 at the base 13 to guide movement of the movable cover module 2 along the sliding rails 131 relative to the mouse body 1. When moving the movable cover module 2 along the sliding rails 131 leftwards and rightwards relative to the mouse body 1, the two stop portions 214 and 215 of the top cover 21 will be alternatively stopped against the ends of the sliding rails 131 to limit the sliding distance of the movable cover module 2 relative to the mouse body 1, preventing falling of the movable cover module 2 out of the sliding rails 131.

Figure 2:
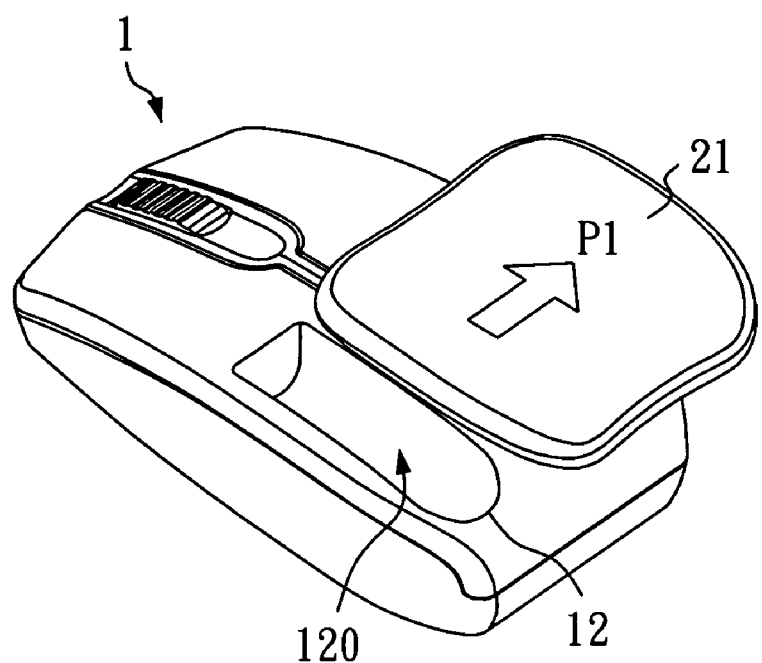
FIG. 2 is a schematic drawing of the first embodiment of the present invention, showing the movable cover module moved to the first open position.
Figure 3:
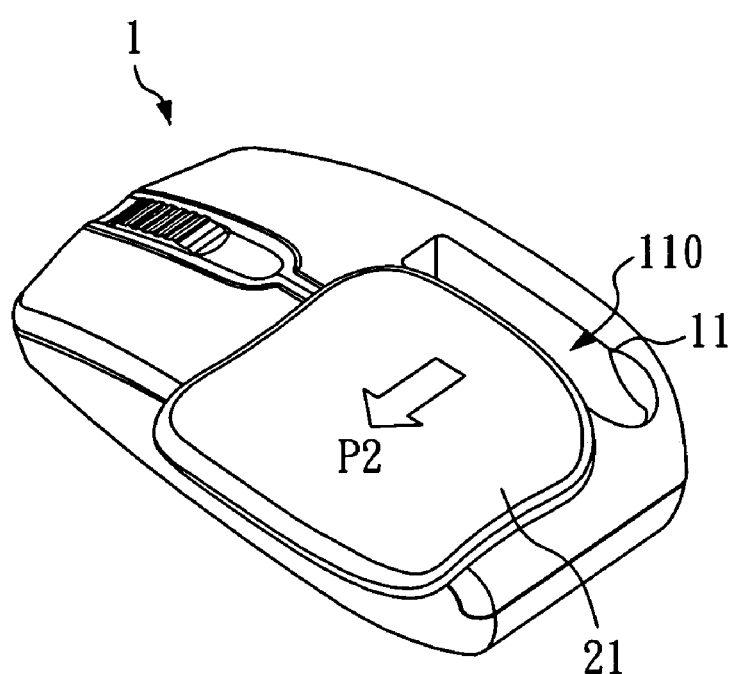
FIG. 3 is a schematic drawing of the first embodiment of the present invention, showing the movable cover module moved to the second open position.
Figure 4:
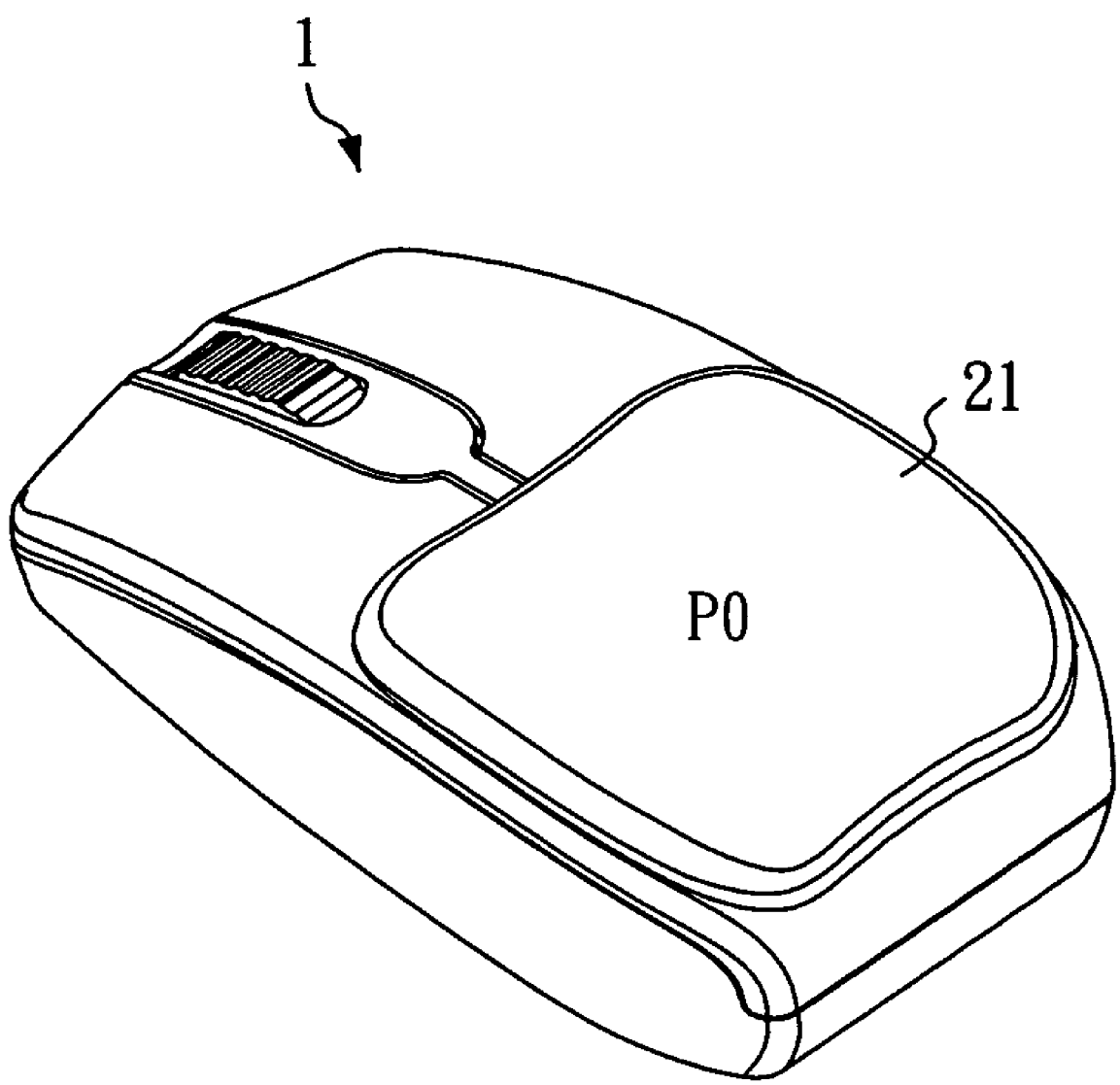
FIG. 4 is a schematic drawing of the present invention, showing the movable cover module moved to the closed position.

FIG. 2 is a schematic drawing of the first embodiment of the present invention, showing the movable cover module moved to the first open position. FIG. 3 is a schematic drawing of the first embodiment of the present invention, showing the movable cover module moved to the second open position. FIG. 4 is a schematic drawing of the present invention, showing the movable cover module moved to the closed position. As shown in FIG. 2, when the top cover 21 is moved with the cross slide 22 relative to the first coupling structure 13 and the mouse body 1 to the position where one screw 224 of the cross slide 22 is aimed at and attracted by the magnetic member 132 of the first coupling structure 13, the top cover 21 is secured to a first open position P1. At this time, the top cover 21 blocks the first opening 11, and the second opening 12 and the second accommodation chamber 120 are exposed to the outside. As shown in FIG. 3, when the top cover 21 is moved with the cross slide 22 relative to the first coupling structure 13 and the mouse body 1 to the position where the other screw 223 of the cross slide 22 is aimed at and attracted by the magnetic member 132 of the first coupling structure 13, the top cover 21 is secured to a second open position P2. At this time, the top cover 21 blocks the second opening 12, and the first opening 11 and the first accommodation chamber 110 are exposed to the outside. As shown in FIG. 4, when the top cover 21 is moved with the cross slide 22 relative to the carriage 13 and the mouse body 1 to the position where the magnetic member 225 of the cross slide 22 is aimed at and attracted by the magnetic member 132 of the first coupling structure 13, the top cover 21 is secured to a closed position P0. At this time, the top cover 21 blocks the first opening 11 and the second opening 12.

According to this embodiment, the two stop portions 214 and 215 of the top cover 21 will be alternatively stopped against the ends of the sliding rails 131 to limit the sliding distance of the movable cover module 2 relative to the mouse body 1 and to prevent falling of the movable cover module 2 out of the sliding rails 131, i.e., when the top cover 21 is moved to the first open position P1, one stop portion 214 of the top cover 21 is stopped against the first ends of the sliding rails 131; when the top cover 21 is moved to the second open position P2, the other stop portion 215 of the top cover 21 is stopped against the second ends of the sliding rails 131. Further, the two sliding rails 131 can be moved with the mouse body 1 along the sliding grooves 221 relative to the top cover 21.

Figure 5:
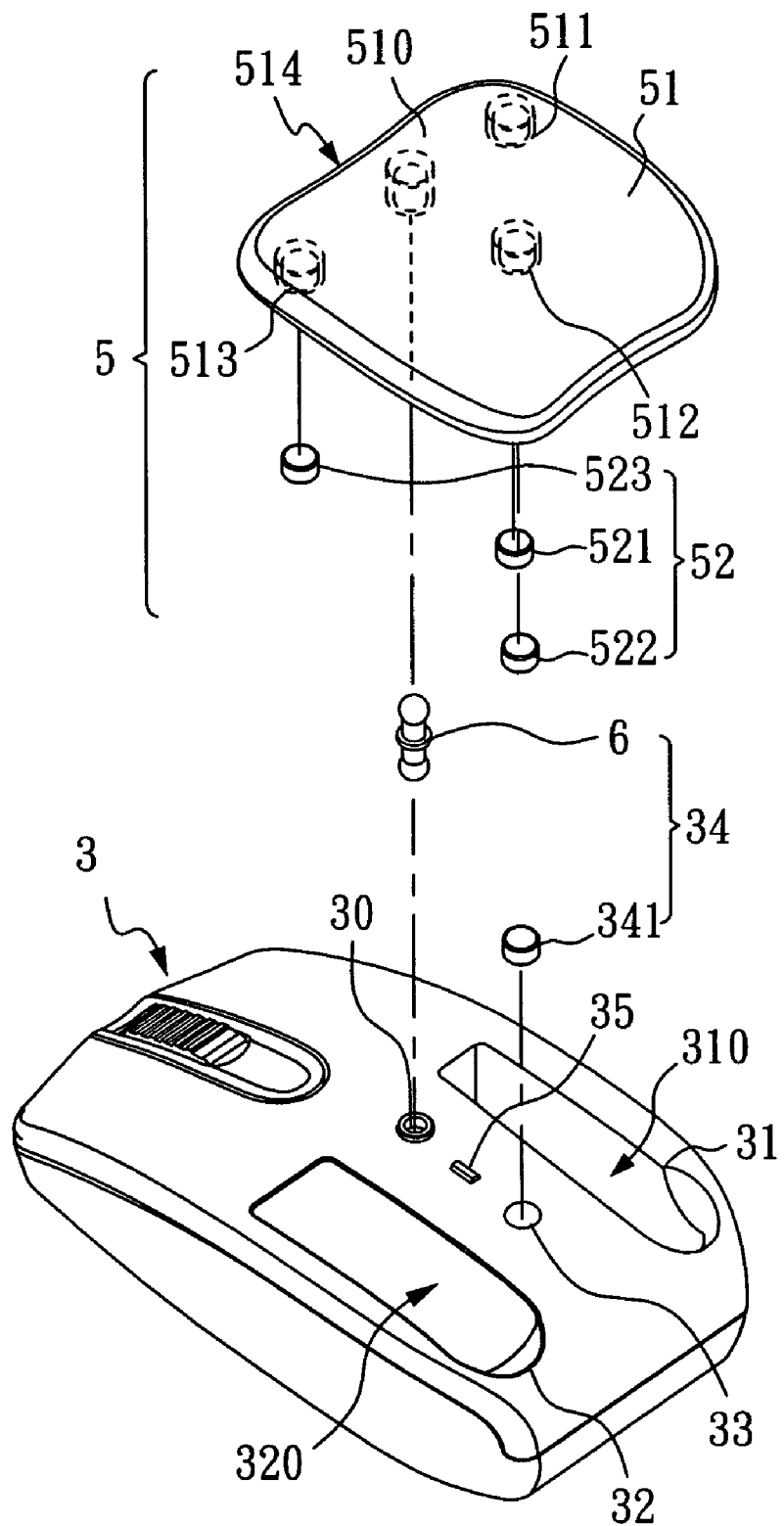
FIG. 5 is an exploded view of a mouse in accordance with a second embodiment of the present invention.

FIG. 5 is an exploded view of a mouse in accordance with a second embodiment of the present invention. According to this second embodiment, the mouse comprises a mouse body 3, and a movable cover module 5. The mouse body 1 has a first opening 31 and a second 32 on the top side, a first accommodation chamber 310 vertically downwardly extending from the first opening 31, a second accommodation chamber 320 vertically downwardly extending from the second opening 32, a locating hole 30 equally spaced between the first opening 31 and the second 32, a recessed mounting hole 33 equally spaced between the first opening 31 and the second 32, and a short stop block 35 protruded from the top side and spaced between the locating hole 30 and the recessed mounting hole 33. Further, a first coupling structure 34 is provided at the mouse body 3. The first coupling structure 34 is comprised of a pivot axle 6 and a magnetic member 341. The movable cover module 5 is comprised of a top cover 51. Further, a second coupling structure 52 is provided at the top cover 51. The top cover 51 has three recessed mounting holes 511, 512 and 513 and a pivot hole 510 respectively formed on the bottom side, and a stop portion 514 protruded from the periphery. The second coupling structure 52 is comprised of three magnetic members 521, 522 and 523. The pivot axle 6 has one end affixed to the locating hole 30 of the mouse body 3, and the other end pivoted to the pivot hole 510 of the top cover 51. The magnetic member 341 of the first coupling structure 34 is bonded to a wall defining the recessed mounting hole 33. The three magnetic members 521, 522 and 523 of the second coupling structure 52 are respectively bonded to walls defining the three recessed mounting holes 511, 512 and 513 of the top cover 51. According to this embodiment, the magnetic member 341 of the first coupling structure 34 and the magnetic members 521, 522 and 523 of the second coupling structure 52 are NdFeB-2 permanent magnets.

Figure 6:
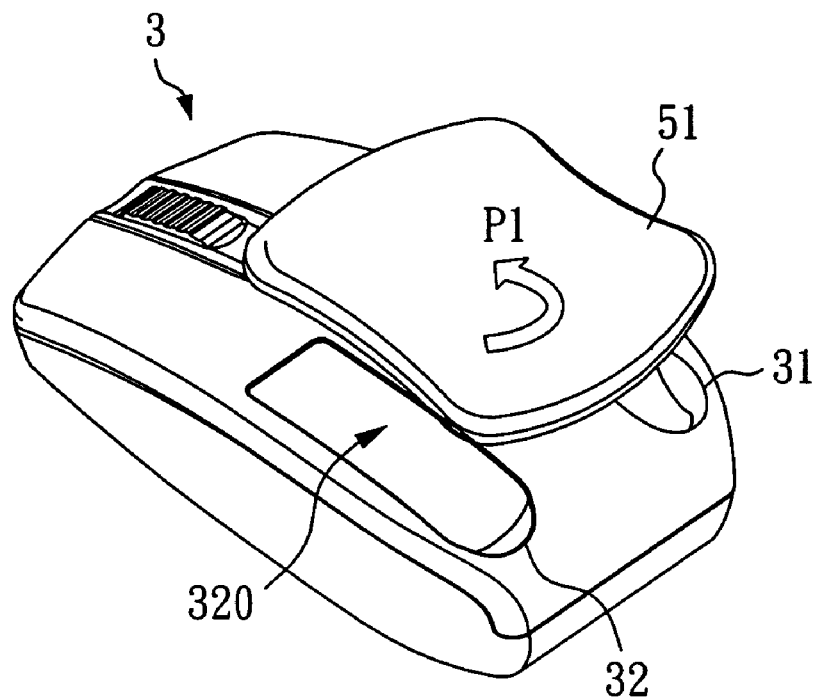
FIG. 6 is a schematic drawing of the second embodiment of the present invention, showing the movable cover module moved to the first open position.
Figure 7:
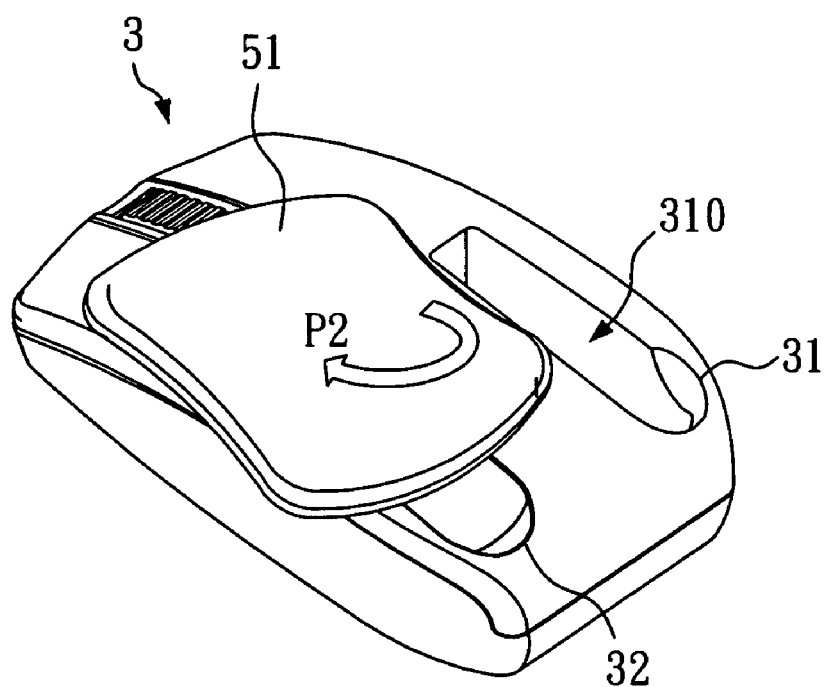
FIG. 7 is a schematic drawing of the second embodiment of the present invention, showing the movable cover module moved to the second open position.

FIG. 6 is a schematic drawing of the second embodiment of the present invention, showing the movable cover module moved to the first open position. FIG. 7 is a schematic drawing of the second embodiment of the present invention, showing the movable cover module moved to the second open position. As shown in FIG. 6, when the top cover 51 is turned about the pivot 6 relative to the mouse body 3 to the first open position P1, one magnetic member 523 of the second coupling structure 52 is aimed at and attracted by the magnetic member 341 of the first coupling structure 34, and the top cover 51 blocks the first opening 31 and opens the second opening 32 and the second accommodation chamber 320. As shown in FIG. 7, when the top cover 51 is turned about the pivot axle 6 relative to the mouse body 3 to the second open position P2, another magnetic member 521 of the second coupling structure 52 is aimed at and attracted by the magnetic member 341 of the first coupling structure 34, and the top cover 51 blocks the second opening 32 and opens the first opening 31 and the first accommodation chamber 310. The closed position P0 according to this second embodiment is similar to the aforesaid first embodiment, thus no further detailed description in this regard is necessary.

According to this second embodiment, the stop portion 514 of the top cover 51 will be stopped against the short stop block 35 to limit the turning angle of the top cover 51 about the pivot axle 6, i.e., when the top cover 51 is turned about the pivot axle 6 counter-clockwise to the first open position P1 or clockwise to the second open position P2, the top portion 514 of the top cover 51 will be stopped against the short stop block 35, thereby limiting the turning angle of the top cover 51.

Therefore, the top cover of the mouse according to the present invention is selectively movable between the first open position and the second open position to close one accommodation chamber and open the other accommodation chamber for allowing different items to be received in different accommodation chambers. Further, one of the two accommodation chambers can be constructed to fit the size of a matching wireless receiver. When the matching wireless receiver is inserted into the associated accommodation chamber, it is secured firmly in place. After the matching wireless receiver has been positioned in the associated accommodation chamber, the top cover is moved to the closed position to close the accommodation chambers, keeping the storage item(s) from sight, and therefore the sense of beauty of the outer appearance of the mouse is maintained.

Although the present invention has been explained in relation to its preferred embodiment, it is to be understood that many other possible modifications and variations can be made without departing from the spirit and scope of the invention as hereinafter claimed.

What is claimed is:

1. A mouse comprising:

a mouse body, said mouse body having a top side, a first accommodation chamber, a first opening formed on said top side and in communication with said first accommodation chamber, a second accommodation chamber, a second opening formed on said top side and in communication with said second accommodation chamber, a coupling structure installed in said top side, a mounting chamber and a mounting opening on said top side and in communication with said mounting chamber for the mounting of the coupling structure of said mouse body; the coupling structure of said mouse body comprises a base, at least one sliding rail fixedly arranged on said base for guiding movement of said movable cover module relative to said mouse body, a recessed mounting hole formed on said base, and a magnetic member bonded to a wall defining said recessed mounting hole for securing said movable cover module to one of said first open position, said second open position and said closed position; and a movable cover module, said movable cover module comprising a top cover and a coupling structure fastened to said top cover and coupled to the coupling structure of said guide structure for allowing movement of said top cover relative to said mouse selectively to a first open position, a second open position, and a closed position;

wherein when said top cover is moved to said first open position, said top cover closes said first opening and said first accommodation chamber and opens said second opening and said second accommodation chamber; when said top cover is moved to said second open position, said top cover closes said second opening and said second accommodation chamber and opens said first opening and said first accommodation chamber; when said top cover is moved to said closed position, said top cover closes said first opening and said first accommodation chamber and said second opening and said second accommodation chamber.

2. The mouse as claimed in claim 1, wherein said top cover has two screw holes; the coupling structure of said movable cover module comprises a cross slide, said cross slide having two mounting through holes corresponding to the two screw holes of said top cover and a recessed mounting hole, at least one sliding groove respectively formed on said cross slide and respectively coupled to the at least one sliding rail of the coupling structure of said mouse body to guide movement of said movable cover module relative to said mouse body, a magnetic member bonded to a wall defining the recessed mounting hole of said cross slide, and two screws respectively inserted through the mounting through holes of said cross slide and threaded into the two mounting screw holes of said top cover to affix said cross slide to said top cover.

3. The mouse as claimed in claim 2, wherein said top cover has two top portions respectively protruded from two ends thereof for stopping against said at least one sliding rail to limit moving distance of said top cover along said at least one sliding rail relative to said mouse body.

4. The mouse as claimed in claim 1, wherein the magnetic member of the coupling structure of said mouse body is an NdFeB-2 permanent magnet.

5. The mouse as claimed in claim 2, wherein the magnetic member of the coupling structure of said movable cover module is an NdFeB-2 permanent magnet.

6. A mouse comprising:

a mouse body, said mouse body having a top side, a first accommodation chamber, a first opening formed on said top side and in communication with said first accommodation chamber, a second accommodation chamber, a second opening formed on said top side and in communication with said second accommodation chamber, a coupling structure installed in said top side, and a locating hole and a recessed mounting hole on said top side; and a movable cover module, said movable cover module comprising a top cover and a coupling structure fastened to said top cover and coupled to the coupling structure of said guide structure for allowing movement of said top cover relative to said mouse selectively to a first open position, a second open position, and a closed position; said top cover has three recessed mounting holes and a pivot hole on a bottom side thereof; the coupling structure of said movable cover module comprises three magnetic members respectively bonded to walls defining the three recessed mounting holes of said top cover; the coupling structure of said mouse body comprises a pivot axle, which has a first end fixedly fastened to the locating hole of said mouse body and a second end pivoted to the pivot hole of said top cover for allowing turning of said top cover about said pivot axle, and a magnetic member bonded to a wall defining the recessed mounting hole of said mouse body and adapted to attract one of the three magnetic members of the coupling structure of said movable cover module and to further hold said top cover in a respective one of said first open position, said second open position and said closed position;

wherein when said top cover is moved to said first open position, said top cover closes said first opening and said first accommodation chamber and opens said second opening and said second accommodation chamber; when said top cover is moved to said second open position, said top cover closes said second opening and said second accommodation chamber and opens said first opening and said first accommodation chamber; when said top cover is moved to said closed position, said top cover closes said first opening and said first accommodation chamber and said second opening and said second accommodation chamber.

7. The mouse as claimed in claim 6, wherein said mouse body further comprises a stop block protruded from said top side; said top cover has a stop portion for stopping against said stop block of said mouse body to limit the turning angle of said top cover about said pivot axle to a predetermined range.

8. The mouse as claimed in claim 6, wherein the magnetic member of the coupling structure of said mouse body is an NdFeB-2 permanent magnet.

9. The mouse as claimed in claim 6, wherein the magnetic members of the coupling structure of said movable cover module are NdFeB-2 permanent magnets.

* * * * *